A. B. BEAN.
Engine-Lathe.
No. 223,099. Patented Dec. 30, 1879.
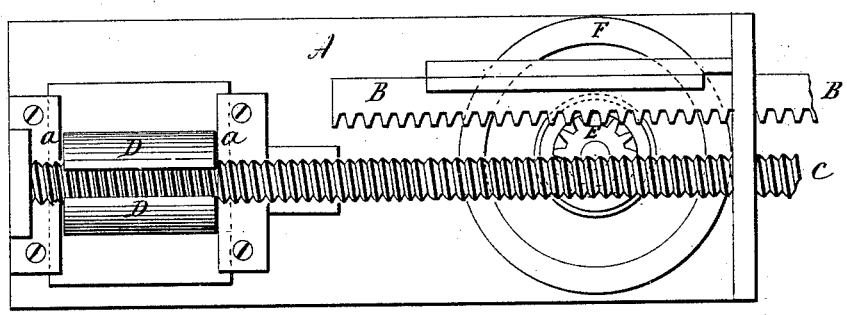
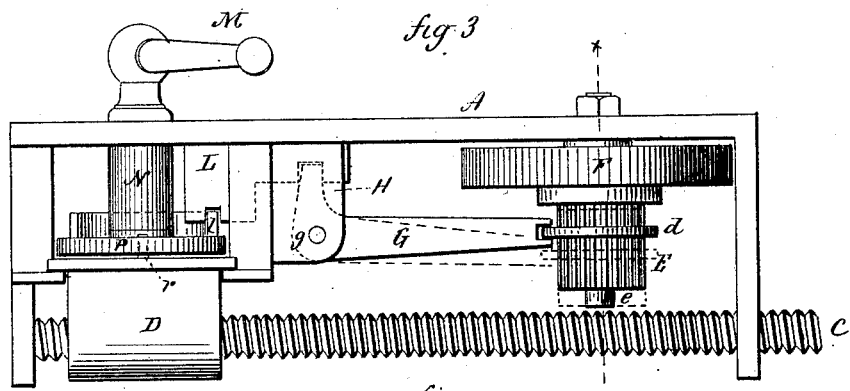
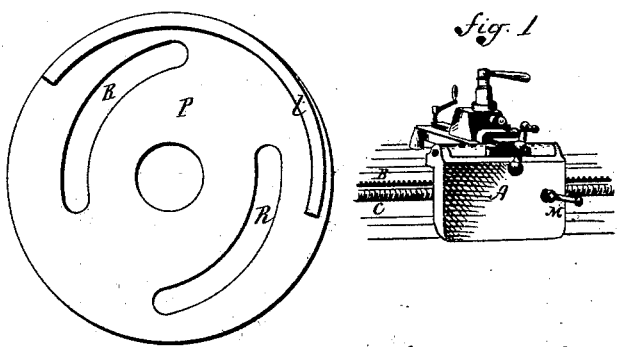
Witnesses
J. H. Shumway
Jos. C. Earl
Albert B. Bean
Inventor
By atty
John E. Earle

UNITED STATES PATENT OFFICE.

ALBERT B. BEAN, OF NEW HAVEN, CONNECTICUT, ASSIGNOR TO NEW HAVEN MANUFACTURING COMPANY, OF SAME PLACE.

IMPROVEMENT IN ENGINE-LATHES.

Specification forming part of Letters Patent No. 223,099, dated December 30, 1879; application filed October 2, 1879.

*To all whom it may concern:*

Be it known that I, ALBERT B. BEAN, of New Haven, in the county of New Haven and State of Connecticut, have invented a new Improvement in Engine-Lathes; and I do hereby declare the following, when taken in connection with the accompanying drawings and the letters of reference marked thereon, to be a full, clear, and exact description of the same, which said drawings constitute part of this specification, and represent, in—

Figure 1, a perspective view of a portion of the lathe complete; Fig. 2, an inside view of the slide, showing the screw, rack, and connections; Fig. 3, a plan of the same; Fig. 4, the cam which operates the shifting-gear; and in Fig. 5, a section on line $x\ x$, Fig. 3.

This invention relates to an improvement in devices for connecting the slide of the lathe with or disconnecting it from either the feeding screw or rack.

In the usual construction of engine-lathes two separate or independent devices are employed for this purpose, one for the screw and the second for the rack, so that in operation the workman should first disconnect the one before he connects the other; but in practice it not unfrequently occurs that he omits one or the other, and an injury to the lathe necessarily follows.

The object of this invention is to overcome this difficulty and make it impossible for simultaneous connection with both the screw and rack.

A represents that part of the slide which extends down in front of the lathe-bed, as seen in Fig. 1; B, the rack, which is stationary on the bed of the lathe, and C the screw, which extends along the side of the lathe, beneath the rack, in the usual manner for screw-cutting purposes.

D D are the two parts of a divided nut, each arranged to move vertically in guides $a$ toward or from the screw, so as to engage with the screw or be disengaged from it, and correspondingly connect or disengage the slide with the screw.

E is the pinion for working in the rack B, and is arranged to slide longitudinally on a stud, $e$, and on said stud is also arranged a driving-wheel, F, the wheel F having no movement longitudinally, but being free to be revolved. On the surface of the wheel F, next the pinion, a device is arranged so that the pinion E and wheel F may be engaged or disengaged. This is here represented as an internal gear, $f$, in the wheel F, corresponding to and so as to receive the wheel F, as seen in Fig. 5, and so that when the pinion is moved away from the wheel or disconnected then the revolution of the wheel F cannot be made to co-operate with the rack B; but when they are in connection, then the slide is also in connection with the rack, and the revolution of the wheel F will cause the slide to move accordingly.

G is one arm of a lever, hung upon a pivot, $g$. The said arm is connected with the pinion E, here represented as by an annular flange, $d$, on the pinion, moving in the forked end of the lever G, as seen in Fig. 2. The other arm, H, of said lever is connected with the longitudinal slide L, and the slide L is operated by a cam, $l$, on the shaft N, the said shaft extending through the front of the slide, and there provided with a handle, M, by which the said shaft may be turned.

The cam $l$ is shown enlarged in Fig. 4, and consists of an eccentric flange on the face of a wheel, P, the flange working in a groove in the slide L, and so that, turning the wheel P in one direction, the lever G will be also turned and throw the pinion E into connection with the wheel F, and in the opposite direction will throw the pinion E out of connection with the wheel F. The wheel P lies directly in front of the two parts D D of the nut, and is constructed with eccentric slots R R. One engages with a stud, $r$, on one part of the nut, and the other slot engages a similar stud on the other part of the nut, so that the turning of the wheel in one direction will draw the two parts of the nut from the screw, and in the opposite direction the said two parts toward each other and into connection with the screw.

The action of the cam $l$ on the lever G and the slot $r$ upon the two parts of the nut are relative to each other, so that when the nut is thrown into connection with the screw the pinion E must be out of connection with the wheel F, and vice versa, and to an intermediate position when neither the screw nor wheel F is engaged, so that the slide may become stationary, or it may be moved either by the screw or by the rack; but by no possibility can an engagement be made with the rack and screw both at the same time.

It will be readily understood that other devices for engaging with the rack may be employed—as, for instance, the pinion may be moved into or in connection with the rack itself without separation from the wheel F; and other adjustment of the lever and its connection with the nut may be made without departing from this invention.

I claim—

The combination, with the divided nut, feed-screw, and rack and pinion, of a driving-wheel and clutch, and a rotating cam-disk, and mechanism connecting said disk with the clutch and also with the divided nut, the said combination being such, substantially as described, as to insure the connection of the nut with the feed-screw simultaneously with the disconnection of the rack-pinion with the pulley, or vice versa, as may be desired.

ALBERT B. BEAN.

Witnesses:
    JOS. C. EARLE,
    J. H. SHUMWAY.